United States Patent [19]

Nishihara et al.

[11] Patent Number: 5,469,543

[45] Date of Patent: Nov. 21, 1995

[54] POLICING CIRCUITS ARRANGED IN MATRIX ARRAY FOR SELECTIVELY TRANSFERRING VIRTUAL PATH IDENTIFIER (VPI) RESPONSIVE TO EITHER VPI OR SERVICE CLASS IDENTIFIER (SCI) THRESHOLD VALUE

[75] Inventors: Motoo Nishihara; Takatoshi Kurano; Naoaki Yamanaka, all of Tokyo; Youichi Sato, Kanagawa, all of Japan

[73] Assignee: NEC Corporation, Japan

[21] Appl. No.: 931,039

[22] Filed: Aug. 14, 1992

[30]   Foreign Application Priority Data

Aug. 14, 1991 [JP] Japan .................................. 3-204285

[51] Int. Cl.⁶ .............................. G06F 7/02; G06F 7/04; G06F 7/10
[52] U.S. Cl. ..................... 395/200.06; 370/54; 370/58.1; 370/58.2; 370/94.1; 370/95.1; 370/60; 364/239.1; 364/259.2; 364/261.5; 364/DIG. 1
[58] Field of Search ..................................... 395/200, 800; 370/60, 94.1, 95.1, 79, 54, 58.1, 58.2

[56]   References Cited

U.S. PATENT DOCUMENTS

| | | | |
|---|---|---|---|
| 4,799,152 | 1/1989 | Chuang et al. | 395/800 |
| 5,179,556 | 1/1993 | Turner | 370/94.1 |
| 5,253,247 | 10/1993 | Hirose et al. | 370/14 |
| 5,258,979 | 11/1993 | Oomuro et al. | 370/95.1 |
| 5,271,005 | 12/1993 | Takase et al. | 370/79 |
| 5,315,586 | 5/1994 | Charvillat | 370/60 |
| 5,323,389 | 6/1994 | Bitz et al. | 370/60.1 |

OTHER PUBLICATIONS

Youichi Sato and Ken-Ichi Sato, Virtual Path and Link Capacity Design for ATM, Jan. 1991, pp. 104–111.
Kowalk et al., The "Policing Function" to Control User Access in ATM Networks—Definition and Implementation—, Jun. 1988, pp. 240–245.

Primary Examiner—Thomas C. Lee
Assistant Examiner—Le Hien Luu
Attorney, Agent, or Firm—Ostrolenk, Faber, Gerb & Soffen

[57]   ABSTRACT

In a policing arrangement for an ATM network, every incoming cell is stored in a cell buffer and a virtual path identifier (VPI) contained in the cell is extracted and translated to a corresponding one of a set of threshold values. Policing circuits of a matrix array are connected column by column for transferring a VPI in accordance with a read/write control circuit. Each policing circuit of the first column is uniquely responsive to a VPI of a particular value for storing the extracted VPI into a bridge memory, and this column has a greater number of policing circuits than any of the other columns of the array. In each column of the array, at least one of the policing circuits includes a cell counter for incrementing a cell count value in response to the VPI of every incoming cell and decrementing the cell count in response to a VPI read out of the bridge memory of the policing circuit. The cell count value is compared with the threshold value and a cell is discarded from the cell buffer when the cell count value exceeds the threshold value.

10 Claims, 7 Drawing Sheets

POLICING CIRCUITS ARRANGED IN MATRIX ARRAY FOR SELECTIVELY TRANSFERRING VIRTUAL PATH IDENTIFIER (VPI) RESPONSIVE TO EITHER VPI OR SERVICE CLASS IDENTIFIER (SCI) THRESHOLD VALUE

BACKGROUND OF THE INVENTION

The present invention relates generally to ATM (asynchronous transfer mode) switched networks and more specifically to a policing (flow enforcement) arrangement of the type known as "dangerous bridge" for an ATM network.

With a broadband ISDN (Integrated Services Digital Network), the user terminal is allowed to send various forms of information of communications services at different transmission rates to the entry point of the ATM network. Call admission control has been proposed to establish a contract value for a particular connection at call setup. Policing function is provided at the entry point of every user terminal to monitor its traffic. If the user traffic violates the contract, a user cell is discarded. A policing scheme of the dangerous bridge (DB) type is one that allows users to transmit cells of a maximum number within a time interval uniquely determined by a virtual path identifier (VPI) of the user cells and a contract value is established according to the VPI. According to a known DB-type policing scheme, a user cell is stored in a cell buffer upon arrival at the network, and a VPI of the incoming cell is held in a "bridge" memory for a duration corresponding to the value of the VPI. There is established a cell count value which is incremented in response to every arrival of user cells and decremented in response to the output of the bridge memory. Comparison is made between the cell count value and the contract value. If the former exceeds the latter, the user traffic is interpreted as violating the contract between the user and the network and a cell in the cell buffer is discarded. However, if the user traffic carries a substantial number of different service classes, the bridge memory would have to be addressed at an impractically high access speed.

SUMMARY OF THE INVENTION

It is therefore an object of the present invention to provide a policing arrangement which relaxes the memory access requirement.

According to a first aspect of the present invention, there is provided a policing arrangement for an ATM network, and the arrangement includes a cell buffer for storing an incoming cell and a virtual path identifier (VPI) detector for detecting a VPI contained in the incoming cell. The VPI is extracted from the cell and translated to a corresponding one of a plurality of threshold (contract) values. A matrix array of policing circuits are provided. The policing circuits of the array are connected column by column for transferring a VPI in accordance with a read/write control circuit. Each policing circuit of a first, marginal column of the array is uniquely responsive to a VPI of particular value for storing a VPI from the VPI detector into a bridge memory, and this column has a greater number of policing circuits than any of the other columns of the array. In each column of the array, at least one of the policing circuits comprises a cell counter for incrementing a cell count value in response to a VPI from the VPI detector and decrementing it in response to a VPI read out of the bridge memory of the policing circuit and a decision circuit for comparing the cell count value with the threshold value and discarding a cell from the cell buffer when the cell count value exceeds the threshold value.

According to a second aspect of the present invention, each policing circuit of the marginal column of the array comprises an address circuit for storing the VPI of a particular value into a location of the policing circuit corresponding to the value of the stored VPI and reading it from the policing circuit so that the VPI is held in the policing circuit for a duration corresponding to the value of the VPI.

BRIEF DESCRIPTION OF THE DRAWINGS

The present invention will be described in further detail with reference to the accompanying drawings, in which.

DETAILED DESCRIPTION

Figure 1:
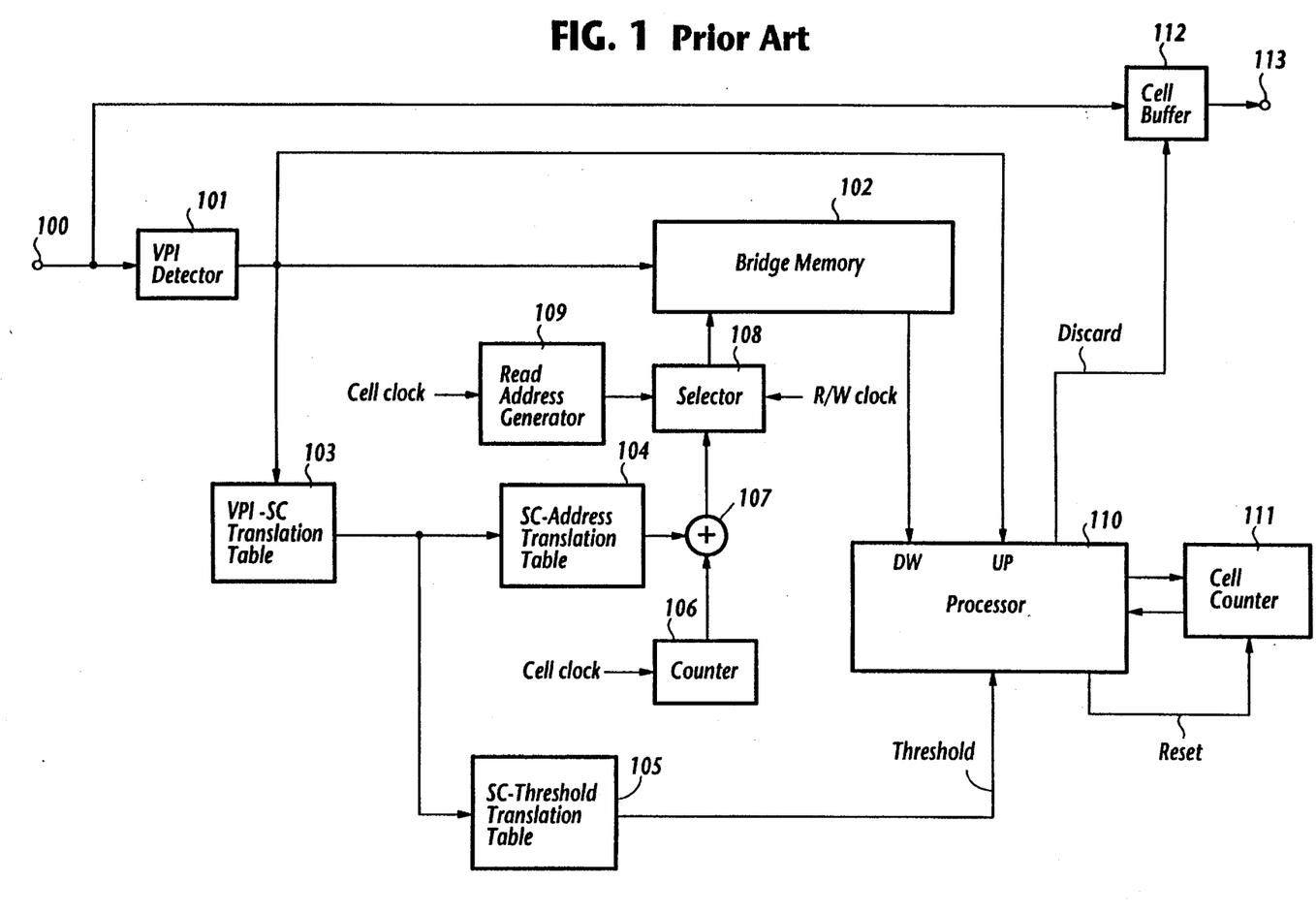
FIG. 1 is a block diagram of a prior art policing arrangement.

Before going into the detail of the present invention, it is appropriate to describe the prior art policing circuit of the dangerous bridge type with reference to FIG. 1. The policing circuit is provided at the entry point of an ATM network for interfacing between a customer premises equipment (CPE) and the network An ATM cell sent from the CPE is received through a subscriber line terminal 100 and stored into a cell buffer 112, and at the same time, it is applied to a VPI (virtual path identifier) detector 101 for detecting and extracting a VPI from the received cell. The extracted VPI is applied to the input of a first-in-first-out bridge memory 102 and a VPI-to-SC (service class) translation table 103 and further to the up-count input of a processor 110. A cell counter 111, which is reset at periodic intervals by processor 110, stores the count value of the detected VPI and constantly updates the count value by incrementing the count in response to the application of a VPI from VPI detector 101 to the up-count input port of processor 110 and decrementing the count in response to the application of a VPI from memory 102 to the down-count input of processor 110.

The translation table 103 produces a service-class identifier that corresponds to the VPI of the cell stored in cell buffer 112 and applies it to a SC-to-address translation table 104 and to a SC-to-threshold translation table 105. Table 104 produces a write address uniquely corresponding to the VPI and applies it to an adder 107 to which a cyclic value is supplied from a counter 106. This unique write address represents a period T during which the VPI is to be held in the memory 102 and the output of counter 106 represents the current value of a cyclic number. The period T is chosen so that it is smaller for high-speed bearer services and greater for lower-speed bearer services. During a write cycle, the output of adder 107 is supplied through a selector 108 to memory 102 so that the VPI is stored in a location which can be accessed by the read address generator 109 to read the VPI a period-T after its writing. The VPI read out of memory 102 is fed into processor 110 through its down-count input port. Translation table 105, on the other hand, converts the service class identifier into a corresponding upper-limit value, or what is known as the "contract value", and applies it to the processor. Processor 110 compares the count value of each VPI stored in counter 111 with the threshold value and applies a command signal to cell buffer 112 depending on the result of the comparison. If incoming cells of a particular service class arrive at a speed higher than the speed assigned to that service class, cell counter 111 would be incremented at a rate higher than would be decremented by the preceding cells and the count value would exceed the threshold value of that service class. Under such circumstances, processor 110 discards the cell stored in cell buffer 112. If the count value is lower than the threshold, the cells are interpreted as arriving at the assigned speed and the cell is read out of buffer 112 and applied to an output terminal 13 which is coupled to an ATM switching fabric or multiplexer, not shown.

Since bridge memory 102 must be accessed with as many write addresses as there are service classes which are provided by the common carrier, the bridge memory 102 must be accessed repeatedly as many times as there are service classes within the duration of a 53-byte long ATM cell. Therefore, if the number of service classes increases, the speed of the read/write operations of the memory 102 must be increased correspondingly.

Figure 2:
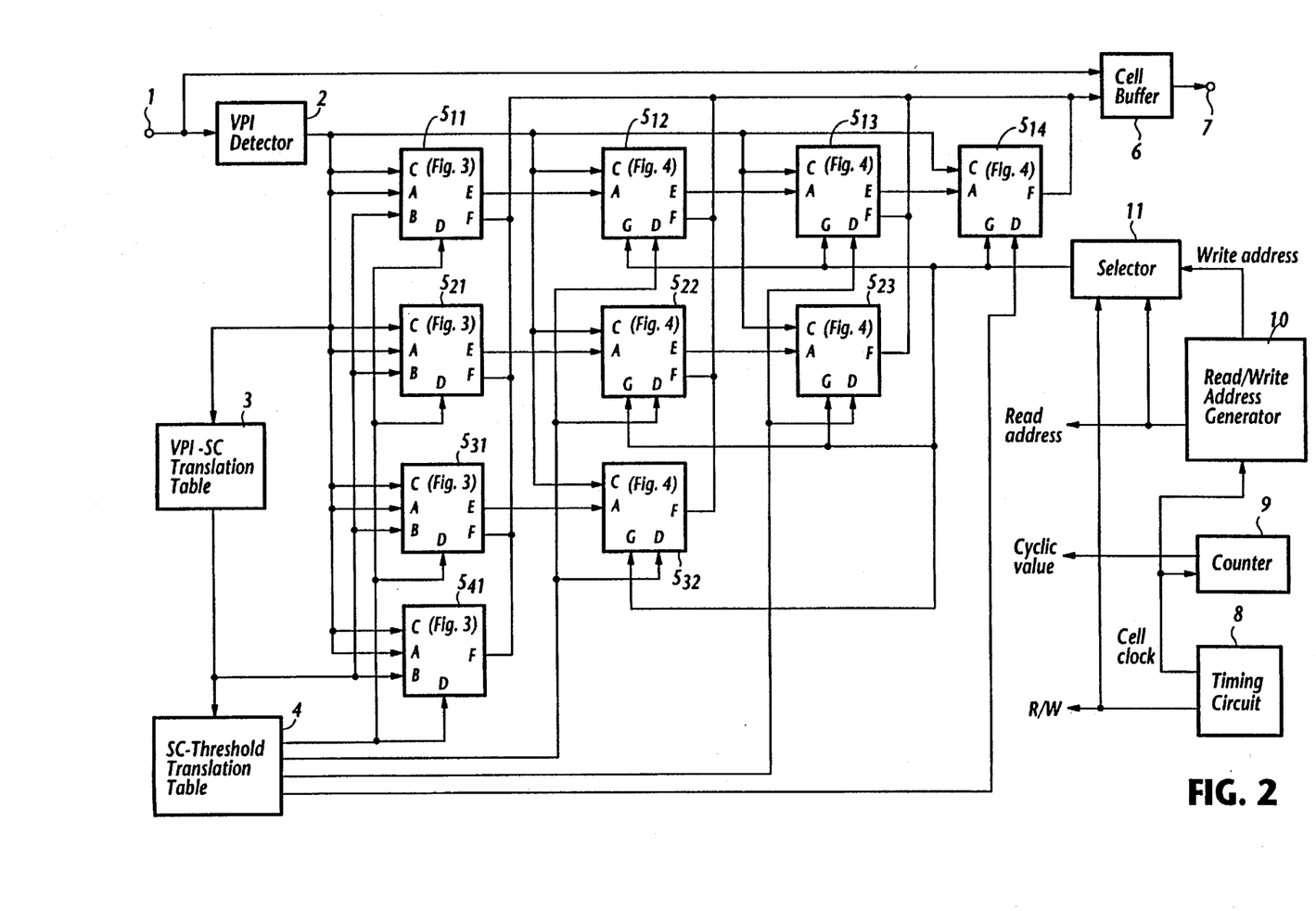
FIG. 2 is a block diagram of a generalized form of the policing arrangement of the present invention.
Figure 3:
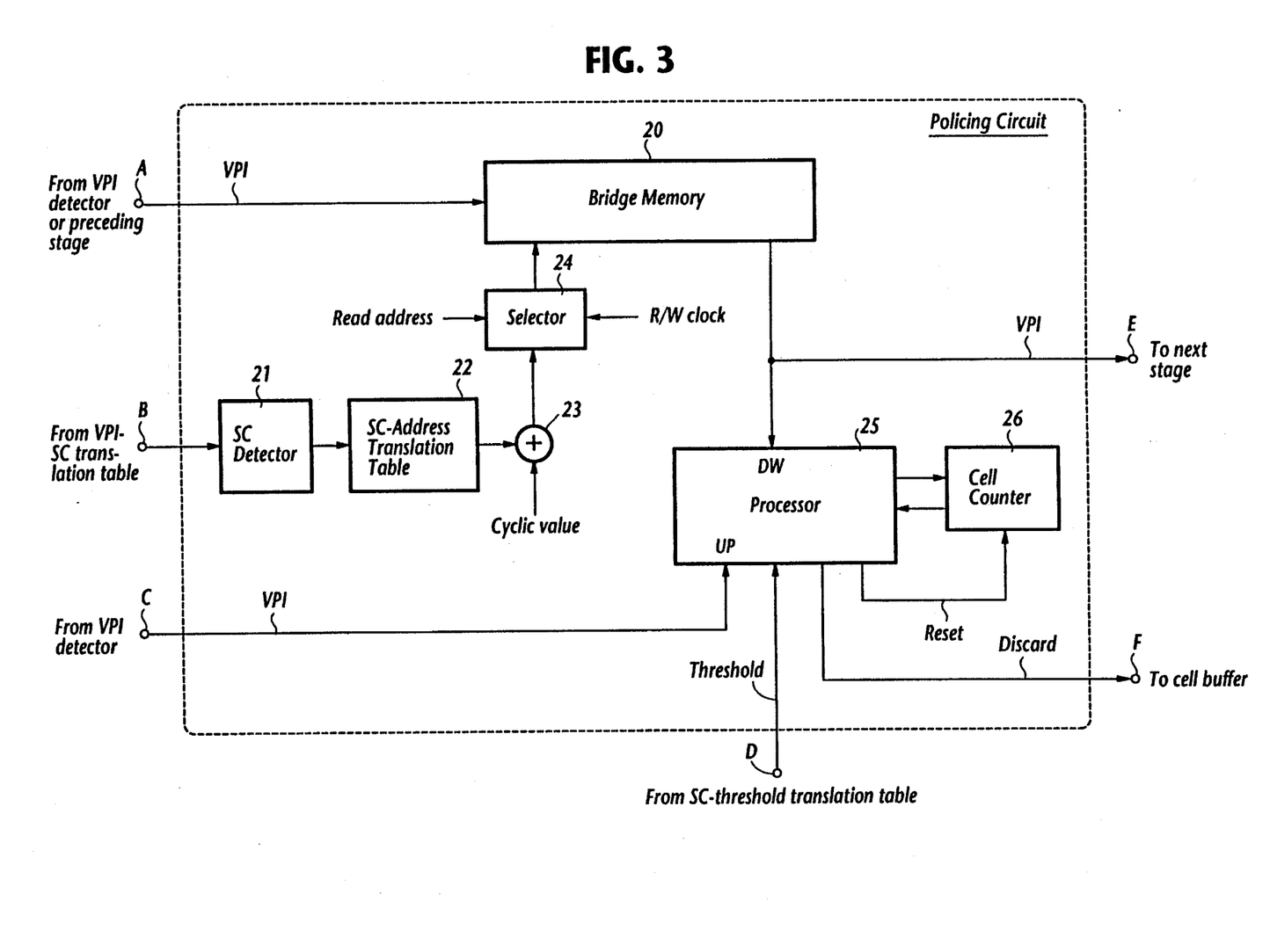
FIG. 3 is a block diagram of a first form of the policing circuits of the present invention.
Figure 4:
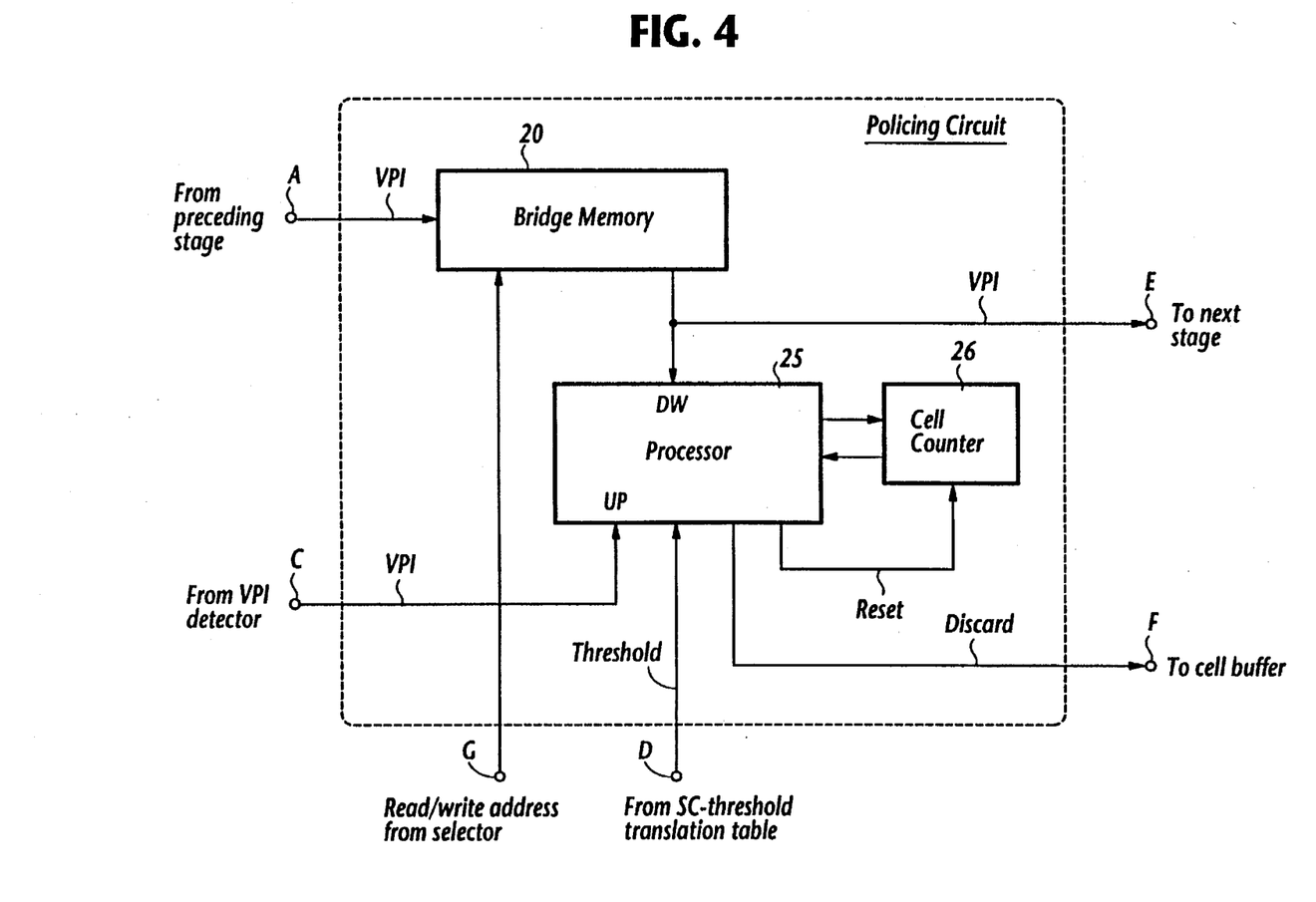
FIG. 4 is a block diagram of a second, simplified form of the policing circuits of the present invention.

Referring to FIGS. 2, 3 and 4, the policing arrangement of the present invention comprises a VPI detector 2 for receiving incoming ATM cells through a line terminal 1 and storing the cells into a cell buffer 6, the output of which is coupled through terminal 7 to the ATM switch or multiplexer. A VPI-SC (service class) translation table 3 is connected to the output of VPI detector 2 to apply a service class identifier to a SC-threshold translation table 4 in which it is decoded and a corresponding upper-limit threshold value is applied to a corresponding one of output lines.

To the output of VPI detector 2 is connected a matrix array of policing (memory) circuits $5_{ij}$, where i and j represent the rows and columns of the array, respectively. The first row of the array comprises a highest number of policing circuits, and for the purpose of the disclosure, four policing circuits $5_{11}$ through $5_{14}$ are illustrated. The second, third and fourth rows of the array include three and two policing circuits and one policing circuit, respectively. The leftmost column of the array is formed by a highest number of policing circuits, (four policing circuits $5_{11}$ through $5_{41}$, in the illustrated embodiment) and the rightmost column has a least number of policing circuits. A timing circuit 8 generates a read/write clock and a cell clock, and a cyclic counter 9 counts the cell clock to produce a cyclic count value. A read/write address generator 10 receives the read/write clock and the cell clock to produce a read and write address. The read address, cyclic value and read/write clock are supplied to the first-stage policing circuits $5_{11}$–$5_{41}$. A selector 11 is provided to receive read and write address signals from address generator 10 to alternately supply write and read addresses to the second- to fourth-stage policing circuits in response to the read/write clock from timing circuit 8.

As shown in FIG. 3, each policing circuit 5 comprises a first-in-first-out bridge memory 20 having an input port coupled to terminal A of the policing circuit to receive a VPI from the VPI detector 2 or from the preceding stage or column of the policing circuit array. Each policing circuit is assigned one or more service classes. A service-class detector 21 is provided for this purpose. This detector is connected to terminal B through which it receives the output of VPI-SC translation table 3 to determine whether the output coincides with one of the assigned service classes. If a coincidence is detected, the matched service class identifier is passed through detector 21 to a SC-to-address translation 22 for conversion to a write address code which is summed with a cyclic value from counter 9 in an adder 23, the output of adder 23 being applied through selector 24 to the address input of bridge memory 20. The read/write clock and read address code are supplied respectively from timing circuit 8 and read/write address generator 10 to selector 24.

A processor 25 receives a VPI from the VPI detector 2 through terminal C to increment the count of the VPI stored in a cell counter 26 and decrement its count in response to the output of bridge memory 20 that is applied through the down-count port of the processor and compares the count with an upper-limit threshold supplied from translation table 4 through terminal D. The output of bridge memory 20 is further coupled through terminal E to the next stage of the policing circuit array.

If incoming cells of a particular service class arrive at a speed higher than the speed of that service class, the count of the VPI would be incremented in counter 26 at a rate higher than would be decremented by the stored VPI's and exceed the threshold value of that service class. Under such circumstances, processor 25 produces a discard command signal which is coupled through terminal F to cell buffer 6. If the count value is lower than the threshold, the cells of the particular service class are interpreted as arriving at the assigned speed and they are allowed to pass through buffer 6 to output terminal 7.

The circuit shown in FIG. 4 is a simplified version of the circuit of FIG. 3 and differs from the latter in that the write address circuitry (21, 22 and 23) of FIG. 3 is replaced with read and write address signals commonly supplied from selector 11 so that a VPI read out of a preceding stage is simply written into the bridge memory and read out of the memory a predetermined time after the writing of the VPI.

Returning to FIG. 2, all policing circuits of the first stage (or column) are constructed of the type of circuit shown in FIG. 3 and the other policing circuits are of the configuration of FIG. 4. The terminal C of all policing circuits of the array are connected to the output of VPI detector 2. The terminals E of all policing circuits except for those having no corresponding circuit in the next stage are coupled to the terminal A of the next-stage policing circuit of the same row, and the terminals F of all policing circuits of the array are connected together to cell buffer 6. The first-stage policing circuits $5_{11}$, $5_{21}$, $5_{31}$ and $5_{41}$ differ from the other policing circuits in that they additionally receive an input VPI from the output of VPI detector 2 through their terminal A for storing the input VPI into their bridge memory. The D terminals of the policing circuits of each stage are connected together to a corresponding one of the output lines of the SC-threshold translation table 4.

The output of VPI-SC translation table 3 is connected to the B terminals of all policing circuits of the first stage and applied to their service class detector 21. According to the present invention, each of the policing circuits of different rows is assigned one or more unique service classes so that a particular VPI from detector 2 is written into the bridge memory of one of the first-stage policing circuits and then transferred to the next-stage policing circuit of the same row at the read/write intervals determined by the read/write clock of the timing circuit 8.

In the illustrated embodiment, the policing circuits of the uppermost row will be used for a lowest-speed transmission service class to which the longest time interval T may be assigned and the lower rows will be used for those service classes having a heavy traffic volume. The total dwelling time of a VPI from the first stage to the last stage of its path is equal to the sum of the individual dwelling times of the successive stages. Due to the parallel arrangement of policing circuits for different service classes, the access time requirement of the policing circuits is significantly relaxed.

Figure 5:
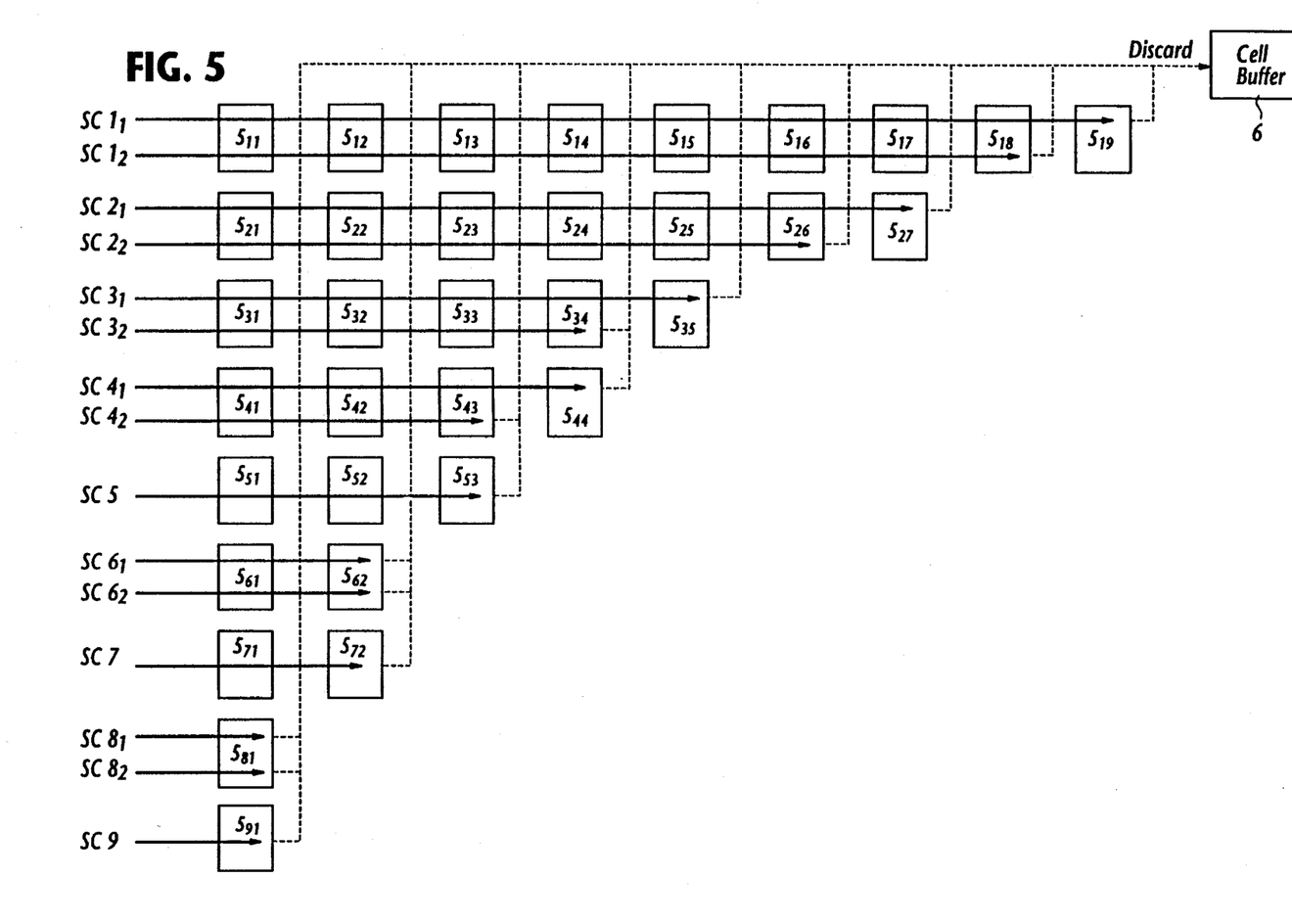
FIG. 5 is a schematic illustration of an example pattern of flows of VPI along different rows of the policing circuit array.

A more detailed example of the policing arrangement of the invention is shown in FIG. 5, which illustrates flows of VPI of different service classes along different rows of the policing circuit array. Lowest-speed service classes SC $1_1$ and SC $1_2$ are assigned to the first-stage policing circuit $5_{11}$ to permit the VPI of service class SC $1_1$ to propagate through intermediate policing circuits $5_{12}$–$5_{18}$ to the last circuit $5_{19}$ where the cell count value of that VPI is determined and compared with the contract value of that service class. Simultaneously, the VPI of service class SC $1_2$ is allowed to propagate through intermediate policing circuits $5_{12}$–$5_{17}$ to circuit $5_{18}$ where the cell count value of this VPI is determined and compared with the contract value of service class SC $1_2$. Similar arrangement of the policing circuits are apparent for service classes SC $2_1$, SC $2_2$–SC $4_1$, SC $4_2$, SC $6_1$, SC $6_2$, SC $8_1$ and SC $8_2$. Service classes with relatively heavy traffic loads and relatively higher speed capabilities such as SC 5, SC 7 and SC 9 are exclusively assigned to the first-stage policing circuits $5_{51}$, $5_{71}$ and $5_{91}$, respectively.

Preferably, the policing circuits of the matrix array delineate a hyperbolic curve since the time interval in which a VPI is held assumes a reciprocal value of the transmission speed of the cell of that VPI.

While the policing apparatus of FIG. 2 is a generalized form of the present invention and allows greater flexibility to meet user's communication needs, it may be beneficial for certain applications to construct the policing apparatus with simplified policing circuits.

Figure 6:
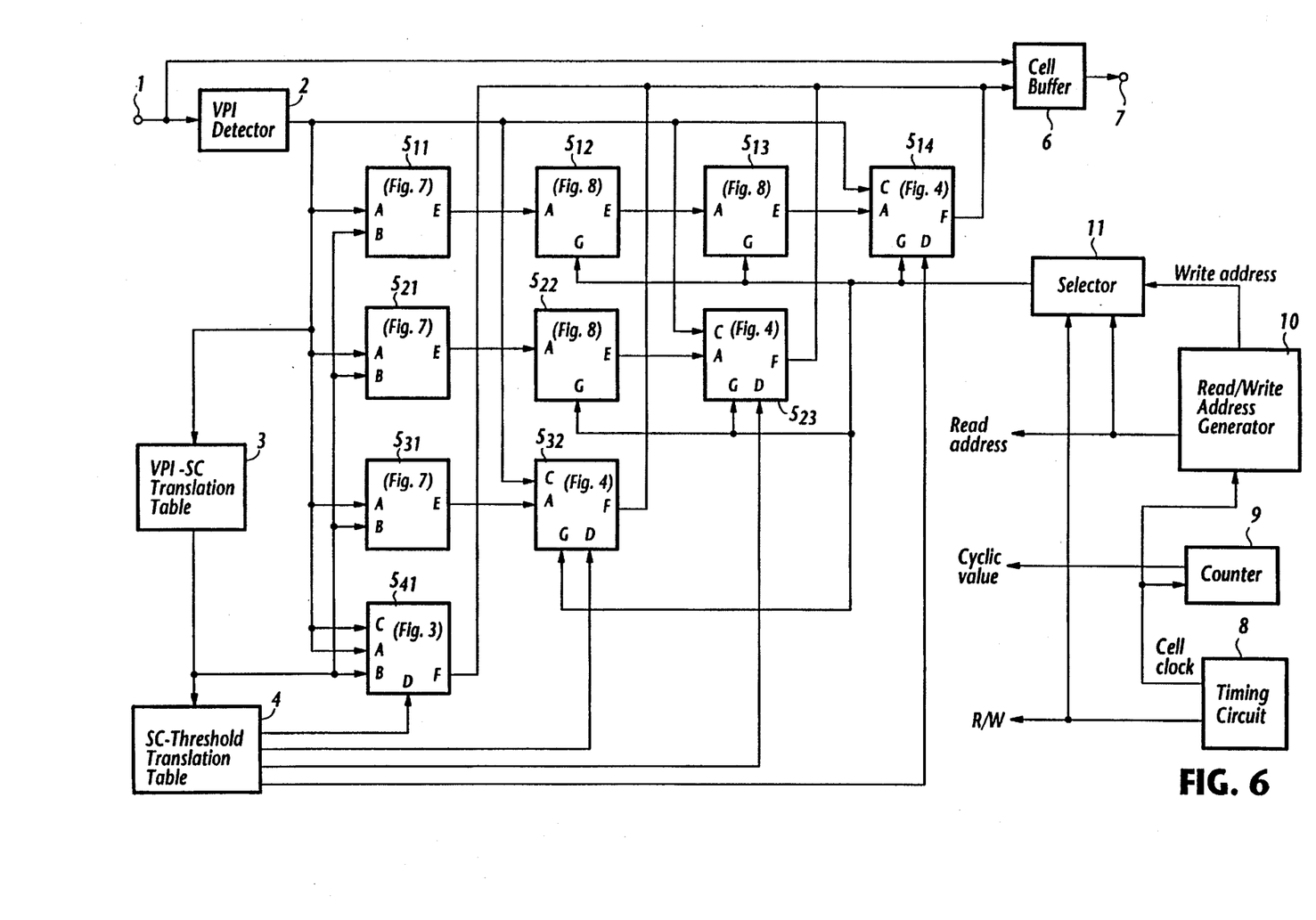
FIG. 6 is a block diagram of a specialized form of the policing arrangement of the present invention.
Figure 7:
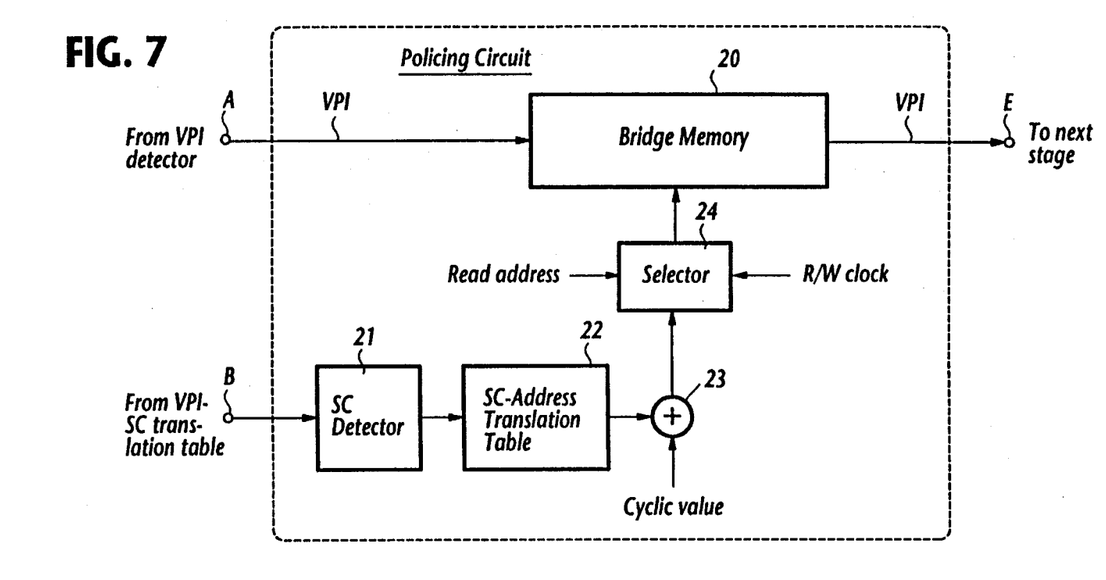
FIGS. 7 and 8 are block diagrams of third and fourth forms of the policing circuits of FIG. 6, respectively.
Figure 8:
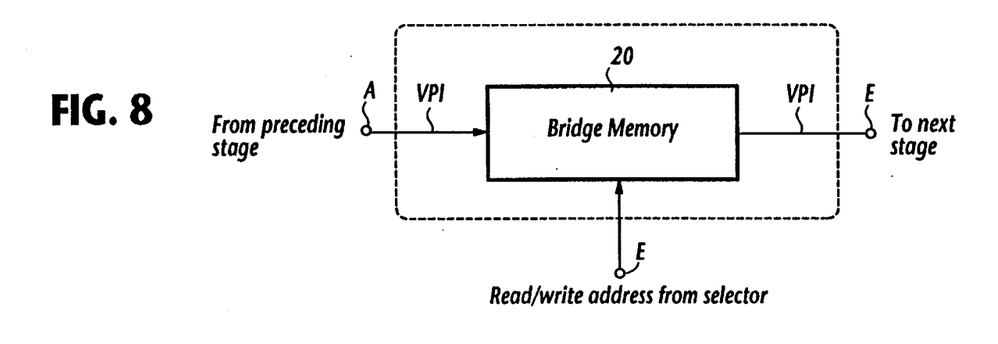

FIG. 6 illustrates a simplified version of the embodiment of FIG. 2. In this modification, policing circuits $5_{11}$, $5_{21}$, $5_{31}$ of the first stage are implemented with a circuit which differs from the circuit of FIG. 3 by eliminating processor 25 and cell counter 26 as shown in FIG. 7. Intermediate policing circuits 512, 522 and 513 are implemented simply with a bridge memory as shown in FIG. 8 which is driven by read/write address supplied from selector 11. The other policing circuits are of the same configuration as that shown in FIG. 4.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A policing arrangement for an asynchronous transfer mode network, comprising:

a cell buffer for storing an incoming cell;

a virtual path identifier (VPI) detector for detecting a VPI contained in said incoming cell and extracting the detected VPI from the cell;

a translation table for converting the extracted VPI to a corresponding one of a plurality of threshold values;

a read/write control circuit for generating a read and write address; and a matrix array of policing circuits each having a bridge memory, the policing circuits of the array being arranged in rows and columns and being connected column by column for transferring a VPI from one column of the array to an adjacent column along rows of the array in accordance with the read and write address supplied from the read/write control circuit wherein each policing circuit of one of the columns of the array, which is the earliest of the columns of the array to transfer the VPI along the rows of the array, is uniquely responsive to a VPI of a particular threshold value, and comprises an address controller for storing the VPI of the particular threshold value into a location of the bridge memory of the policing circuit corresponding to the value of the stored VPI and reading the stored VPI from the bridge memory so that said VPI is held in said bridge memory for a duration corresponding to the value of the said VPI.

2. The policing arrangement of claim 1, wherein at least one of the policing circuits of each column of the array includes a counter for incrementing a cell count value in response to a VPI from said VPI detector and decrementing the cell count value in response to a VPI read out of the bridge memory of the policing circuit, and a processor for comparing said cell count value with the threshold value supplied from said translation table and discarding a cell from said cell buffer when said cell count value exceeds said threshold value.

3. The policing arrangement of claim 1, wherein said earliest of the columns of the array has a greater number of policing circuits than any of the other columns of the array.

4. A policing arrangement for an asynchronous transfer mode network, comprising:

a cell buffer for storing an incoming cell;

a virtual path identifier (VPI) detector for detecting a VPI contained in said incoming cell and extracting the detected VPI from the cell;

a first translation unit for converting the extracted VPI to a corresponding one of a plurality of service class identifiers;

a second translation unit for converting a service class identifier (SCI) from said first translation unit into a corresponding one of a plurality of threshold values;

a read/write control circuit for generating a read and write address; and a matrix array of policing circuits each having a bridge memory, the policing circuits of the array being arranged in columns and rows and being connected column by column for transferring a VPI from one column of the array to an adjacent column along rows of the array in accordance with the read and write address generated by read/write control circuit; wherein each policing circuit of one of the columns of the array, which is the earliest of the columns of the array to transfer the VPI along the rows of the array, is uniquely responsive to a SCI of a particular value, and comprises an address controller for storing a VPI from the VPI detector into the bridge memory of the policing circuit in accordance with the particular value of the SCI and reading the stored VPI from the bridge memory so that said VPI is held in said bridge memory for a duration corresponding to the value of said SCI.

5. The policing arrangement of claim 4, wherein at least one of the policing circuits of each column of the array includes a counter for incrementing a cell count value in response to a VPI from said VPI detector and decrementing the cell count value in response to a VPI read out of the bridge memory of the policing circuit, and a processor for comparing said cell count value with the threshold value supplied from said second translation unit and discarding a cell from said cell buffer when said cell count value exceeds said threshold value.

6. The policing arrangement of claim 4, wherein said earliest of the columns of the array has a greater number of policing circuits than any of the other columns of the array.

7. A policing arrangement for an asynchronous transfer mode network, comprising:

a cell buffer for storing an incoming cell;

a virtual path identifier (VPI) detector for detecting a VPI contained in said incoming cell and extracting the detected VPI from the cell;

translation means for converting the extracted VPI to a corresponding one of a plurality of threshold values;

read/write control means; and a matrix array of policing circuits each having a bridge memory, the policing circuits of the array being connected column by column for transferring a VPI from one column of the array to an adjacent column along rows of the array in accordance with the read/write control means, wherein each policing circuit of one of the columns of the array, which is the earliest of the columns of the array to transfer the VPI along the rows of the array, is uniquely responsive to a VPI of particular value, and comprises address means for storing the VPI of particular value into a location of the bridge memory of the policing circuit corresponding to the value of the stored VPI and reading the stored VPI from the bridge memory so that said VPI is held in said memory for a duration corresponding to the value of said VPI, at least one of the policing circuits of each column of the array comprising counter means for incrementing a cell count value in response to a VPI from said VPI detector and decrementing the cell count value in response to a VPI read out of the bridge memory of the policing circuit, and decision means for comparing said cell count value with the threshold value supplied from said translation means and discarding a cell from said cell buffer when said cell count value exceeds said threshold value.

8. A policing arrangement as claimed in claim 7, wherein said earliest of the columns of the array has a greater number of policing circuits than any of the other columns of the array.

9. A policing arrangement for an asynchronous transfer mode network, comprising:

a cell buffer for storing an incoming cell;

a virtual path identifier (VPI) detector for detecting a VPI contained in said incoming cell and extracting the detected VPI from the cell;

first translation means for converting the extracted VPI to a corresponding one of a plurality of service class identifiers;

second translation means for converting a service class identifier (SCI) from said first translation means into a corresponding one of a plurality of threshold values;

read/write control means; and a matrix array of policing circuits each having a bridge memory, the policing circuits of the array being connected column by column for transferring a VPI from one column of the array to an adjacent column along rows of the array in accordance with the read/write control means, wherein each policing circuit of one of the columns of the array, which is the earliest of the columns of the array to transfer the VPI along the rows of the array, is uniquely responsive to an SCI of particular value, and comprises address means for storing a VPI from the VPI detector into the bridge memory of the policing circuit in accordance with the value of the SCI and reading the stored VPI from the bridge memory so that said VPI is held in said memory for a duration corresponding to the value of said SCI, at least one of the policing circuits of each column of the array comprising counter means for incrementing a cell count value in response to a VPI from said VPI detector and decrementing the cell count value in response to a VPI read out of the bridge memory of the policing circuit, and decision means for comparing said cell count value with the threshold value supplied from said second translation means and discarding a cell from said cell buffer when said cell count value exceeds said threshold value.

10. A policing arrangement as claimed in claim 9, wherein said earliest of the columns of the array has a greater number of policing circuits than any of the other columns of the array.

* * * * *

UNITED STATES PATENT AND TRADEMARK OFFICE
CERTIFICATE OF CORRECTION

PATENT NO. :    5,469,543
DATED      :    February 21, 1996
INVENTOR(S) :   Motoo NISHIHARA, et al.

It is certified that error appears in the above-indentified patent and that said Letters Patent is hereby corrected as shown below:

Title page, item 73, for "Assignee NEC Corporation, Japan" should be corrected to --Assignee NEC Corporation, Japan; Nippon Telegraph and Telephone Corporation, Japan--

Signed and Sealed this

Fourth Day of June, 1996

Attest:

BRUCE LEHMAN

*Attesting Officer*    *Commissioner of Patents and Trademarks*